United States Patent [19]

Koga et al.

[11] Patent Number: 5,270,127
[45] Date of Patent: Dec. 14, 1993

[54] PLATE SHIFT CONVERTER

[75] Inventors: Minoru Koga, Kawasaki; Souichirou Kawakami, Narashino; Minoru Mizusawa, Yokahoma, all of Japan

[73] Assignee: Ishikawajima-Harima Heavy Industries Co., Ltd., Tokyo, Japan

[21] Appl. No.: 910,817

[22] Filed: Jul. 9, 1992

[30] Foreign Application Priority Data

Aug. 9, 1991 [JP] Japan .................... 3-223597
Aug. 12, 1991 [JP] Japan .................... 3-225383

[51] Int. Cl.⁵ .................... H01M 8/04; H01M 8/18
[52] U.S. Cl. .................... 429/17; 429/20; 429/19; 429/26; 422/173; 422/174; 422/177
[58] Field of Search .................... 429/17, 20, 19, 26; 422/173, 174, 177

[56] References Cited

U.S. PATENT DOCUMENTS

| 4,933,242 | 6/1990 | Koga et al. | 429/19 |
| 5,015,444 | 5/1991 | Koga et al. | 472/195 |

FOREIGN PATENT DOCUMENTS

| 0429958 | 6/1991 | European Pat. Off. |
| 0430184 | 6/1991 | European Pat. Off. |
| 1553361 | 1/1969 | France |
| 63-291802 | 11/1988 | Japan |
| 2-80301 | 3/1990 | Japan |

OTHER PUBLICATIONS

Patent Abstracts of Japan, vol. 14, No. 270(C-727) (4313), 12 Jun. 1990 (JPA 2-80 301).
Patent Abstracts of Japan, vol. 13, No. 119(C-579) (3467) 23 Mar. 1989 (JPA 63-291, 802).
Chemical Abstracts 110:234633a, 26 Jun. 1989 (JPA 63-291, 802).

*Primary Examiner*—Kathryn Gorgos
*Attorney, Agent, or Firm*—Trexler, Bushnell, Giangiorgi & Blackstone

[57] ABSTRACT

A plate type shift converter comprises a stack of alternately piled shift reactor plates and cooling plates and various gas intake and exhaust manifolds mounted on lateral faces of the stack. Each shift reactor plate includes a plate member, a masking frame provided along the periphery of the plate member, a gas entrance formed in the masking frame, a gas exit formed at a location opposite the gas entrance in the masking frame and a shift catalyst located in the masking frame. Each cooling plate includes a plate member, a masking frame provided along the periphery of the plate member, a gas entrance formed in the masking frame, a gas exit formed at a location opposite the second gas entrance in the masking frame and a fin plate located in the masking frame. When gases are introduced to the shift reactor plate, the gases undergo the CO shift reaction (exothermic reaction) as they flow contacting the shift catalyst. At the same time, the gases are cooled by the cooling plates which sandwich the flow of the gases or sandwich the shift reactor plate.

25 Claims, 9 Drawing Sheets

PLATE SHIFT CONVERTER

BACKGROUND OF THE INVENTION

1. Technical Field

The present invention generally relates to a phosphoric acid fuel cell (fuel cell using a phosphoric acid solution as an electrolyte), and particularly to a plate type shift converter used for a phosphoric acid fuel cell to lower a CO concentration.

2. Background Art

Phosphoric acid fuel cells have been developed as a first generation fuel cell and some types of phosphoric acid fuel cells are now practiced.

Referring to FIG. 10 of the accompanying drawings, a typical phosphoric acid fuel cell includes a phosphoric acid solution-soaked electrolyte plate 1, an air electrode 2 and a fuel electrode 3. The electrolyte plate 1 is sandwiched by these electrodes 2 and 3. Further, the electrodes 2 and 3 support catalysts. In this fuel cell, if hydrogen gas (fuel gas FG) is fed to the fuel electrode 3, a following reaction takes place at the fuel electrode side 3:

$$H_2 \rightarrow 2H^+ + 2e^-.$$

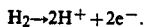

As a result, hydrogen emits electrons and becomes an hydrogen ions. The hydrogen ions $2H^+$ move through the electrolyte plate 1 and reach the air electrode 2 whereas the electrons $2e^-$ proceed to the air electrode 2 via an external circuit.

On the other hand, oxygen fed to the air electrode 2 receives the electrons $2e^-$ and reacts with the hydrogen ions $2H^+$ to cause a following reaction:

$$2e^- + 1/2O_2 + 2H^+ \rightarrow H_2O.$$

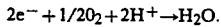

Accordingly, water ($H_2O$) is produced and a direct current electricity is generated between the air electrode 2 and the fuel electrode 3. This is the power generation by the fuel cell.

One of the conventional power generation systems using the phosphoric acid fuel cell is shown in FIG. 11 of the accompanying drawings.

This power generation system includes a phosphoric acid fuel cell I, a reformer 4, a high temperature shift converter 5, a low temperature shift converter 6, a heat exchanger 8 and a gas-liquid separator 9. The fuel cell I is provided with a cooling portion 7 near the fuel electrode 3. The reformer 4 reforms town gas TG with steam to produce fuel gas. In the high and low temperature shift converters 5 and 6, CO contained in the fuel gas reacts with $H_2O$ to produce $CO_2$ and $H_2$. The heat exchanger 8 is used to recover heat.

In this power generation system, in order to avoid the deterioration of a catalyst held by the fuel electrode 3 of the fuel cell I by CO of the fuel gas, the fuel gas produced by the reformer 4 is introduced to the high and low temperature shift converters 5 and 6 before the fuel gas is fed to the fuel electrode 3. Specifically, the CO concentration of the fuel gas is reduced to 1% or less in the shift converters 5 and 6.

In the shift converters 5 and 6, a following reaction (CO shift reaction) takes place:

$$CO + H_2O \rightarrow CO_2 + H_2.$$

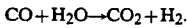

FIG. 12 shows a relation between the equilibrium concentration of CO and the temperature when reformed methane gas undergoes the shift reaction. As seen in FIG. 12, the ultimate reaction temperature should be 250° C. or lower, in order to restrain the CO concentration of the fuel gas supplied to the fuel electrode 3 to 1% or less. However, the reaction speed becomes slow at such a temperature. If the reaction speed is slow, all the CO cannot be treated.

To avoid this, as shown in FIG. 11, the fuel gas which has been reformed by the reformer 4 is introduced to a high temperature shift converter 5 of which reaction speed is sufficiently high. The remaining CO is treated by a low temperature shift converter 6 which follows the high temperature shift converter 5, such that the CO concentration is lowered to 1% or less.

The power generation system may include only one shift converter as shown in FIG. 13.

In the system of FIG. 13, the phosphoric acid fuel cell I includes a plurality of fuel cell elements. Each element has an electrolyte plate 1, an air electrode 2 and a fuel electrode 3, and the elements are stacked with separator plates being interposed between the elements. The fuel electrode 3 is provided with a cooling portion 7.

Between the reformer 4 and the shift converter 6, provided is a heat exchanger 10 for the fuel gas. The heat exchanger 10 is used to lower the gas temperature at the shift converter 6 exit to 250° C. or less.

The town gas TG flows through the shift converter 6 from the heat exchanger 10. Then, the town gas TG is introduced into a reforming portion 4a of the reformer 4. At the same time, steam is introduced into the reforming portion 4a from a steam line 11. The town gas is reformed to the fuel gas in the reformer 4. The fuel gas is cooled by the heat exchanger 10 and guided into the shift converter 6. The CO concentration of the fuel gas is reduced to 1% or less in the shift converter 6. After that, the fuel gas is fed to the fuel electrode 3 of the fuel cell I. On the other hand, air A is fed to the air electrode 2. Gases discharged from the fuel electrode 3 (called "anode exhaust gas") are fed to a combustion chamber 4b of the reformer 4. Further, air A is fed to the combustion chamber 4b of the reformer 4. Accordingly, combustible gaseous components among the anode exhaust gas are combusted and the reforming temperature is maintained. Gases from the combustion chamber 4b of the reformer 4 are introduced to a water recovery condenser 12 with gases from the air electrode 2 (called "cathode exhaust gas"). Condensed $H_2O$ (water) is led to a water tank 13 whereas gases are expelled out of the line.

The water in the water tank 13 is fed to a cooling water circulation line 16 via a water treating device 14 and a water pump 15. A gas-liquid separator 17 is provided on the cooling water circulation line 16. The water in the separator 17 is forced to another heat exchanger 19 by a pump 18 and then part of the water is introduced to the cooling portion 7 of the fuel electrode 3 and the remainder is introduced to the heat exchanger 10 and gas-liquid separator 17. Steam produced in the gas-liquid separator 17 is fed to the reformer 4, as the reforming steam for the reformer 4, via the heat exchanger 10 from a steam line 11.

A coolant circulation line 20 is connected to a heat exchanger 19. A pump 21, a water recovery condenser 12, a waste heat recovery heat exchanger 22 and a cooling tower 23 are provided on the coolant circulation line 20.

An inverter 24 is connected to the fuel electrode 3 and air electrode 2 of the phosphoric acid fuel cell stack I.

An exothermic reaction is caused in the shift converters 5 and 6 of FIGS. 11 and 13 and the CO-containing gases (concentration of CO is between about 2% to about 19%) are shifted in the shift converters. Heat produced upon the exothermic reaction is taken away and the temperature is lowered when the gases are in the shift converters. Accordingly, the gases contain only 1% of CO when they go out of the shift converters. However, since the conventional shift converter has a small heat transfer area, the shift converter should be designed in large dimensions if a sufficient removal of heat produced upon the exothermic reaction is required. Generally, the heat removal is a requisite so that the shift converter cannot be designed compact.

The power generation system using the phosphoric acid fuel cell stack is expected to be used in downtown areas, for example in hotels, hospitals and apartments. However, the power generation system using the phosphoric acid fuel cell stack includes individual units, namely fuel cell stack I, reformer 4, heat exchanger 10 and shift converters 5 and 6 and these units require a large space for their installation. Further, these individual units need complicated pipings between themselves. In addition, a heat loss is quite large in this type of power generation system.

SUMMARY OF THE INVENTION

An object of the present invention is to provide a compact shift converter or to provide a plate type shift converter.

Another object of the present invention is to provide a power generation system using a phosphoric fuel cell stack, individual units of which are compact, pipings of which are simple and heat loss of which is small.

According to one aspect of the present invention, there is provided a plate type shift converter arrangement which comprises a stack of alternately piled shift reactor plates and cooling plates (or plate type cooling devices), a gas intake manifold mounted on a lateral portion of the stack for covering gas entrances of the shift reactor plates, another gas intake manifold for covering gas entrances of the cooling plates, a gas exhaust manifold mounted on the lateral portion of the stack for covering gas exits of the shift reactor plates and another gas exhaust manifold for covering gas exits of the cooling plates. Each shift reactor plate includes a first plate member, a first masking frame provided along the periphery of the first plate member, a first gas entrance formed in the first masking frame, a first gas exit formed at a location opposite the first gas entrance in the first masking frame and a shift catalyst located in the first masking frame. Each cooling plate includes a second plate member, a second masking frame provided along the periphery of the second plate member, a second gas entrance formed in the second masking frame, a second gas exit formed at a location opposite the second gas entrance in the second masking frame and a fin plate located in the second masking frame.

According to another aspect of the present invention, there is provided a power generation system which comprises a stack of a plate type reformer, a plate type heat exchanger and a plate type shift converter, a stack of phosphoric acid fuel cell elements and a housing for these two stacks. The plate type reformer includes a stack of a reforming reactor plate, a reforming catalyst located in the reforming reactor plate, with a raw material gas being fed to the reforming reactor plate, a combustor plate, a combustion catalyst located in the combustion plate, with air being fed to the combustor plate, and a fuel introduction plate for receiving fuel gas and feeding the fuel gas to the combustor plate. The plate type heat exchanger includes a stack of a high temperature fin plate, a low temperature fin plate and a separator plate interposed between the high and low temperature plates. The plate type shift converter includes a stack of a shift reactor plate, a shift catalyst located in the shift reactor plate and a cooling plate. A cooling agent flows through the cooling plate. The fuel cell element includes an electrolyte plate, an air electrode and a fuel electrode. The electrolyte plate is sandwiched by the two electrodes. The fuel gas from the reforming reactor plate of the reformer is introduced to the high temperature fin plate of the heat exchanger, the shift reactor plate of the shift converter and the fuel electrode of each fuel cell element.

With the plate type shift converter arrangement of the present invention, when gases which contain 11-19% of CO are introduced to the shift reactor plate, the gases undergo the CO shift reaction (exothermic reaction) as they flow through the shift catalyst. At the same time, the gases are cooled by the cooling plates which sandwich the flow of the gases. (The shift reactor plate is sandwiched by the cooling plates). Therefore, the gas temperature at the shift reactor plate exit is adjusted to a low value and the CO concentration among the gases are lowered to 1% or less. Further, since the shift reactor of the present invention is a plate type, a heat transfer area per unit area is large. Accordingly, the shift reactor can be designed compact.

Since the power generation system of the present invention uses the plate type shift converter, the plate type reformer and the plate type heat exchanger, the power generation system can be designed compact since the plate type units can be piled up and can be installed in a single housing. In addition, since these individual units are located closed to each other, pipings becomes simple and a heat loss is reduced as compared with the conventional arrangement.

Other aspects, objects and advantages of the present invention will become apparent by reference to the following detailed description taken in conjunction with the various figures and appended claims.

DESCRIPTION OF THE PREFERRED EMBODIMENTS

Now, preferred embodiments of the present invention will be described with FIGS. 1 to 9 of the accompanying drawings.

First, a plate type shift converter arrangement 30 will be explained with FIGS. 1 to 5.

Figure 1:
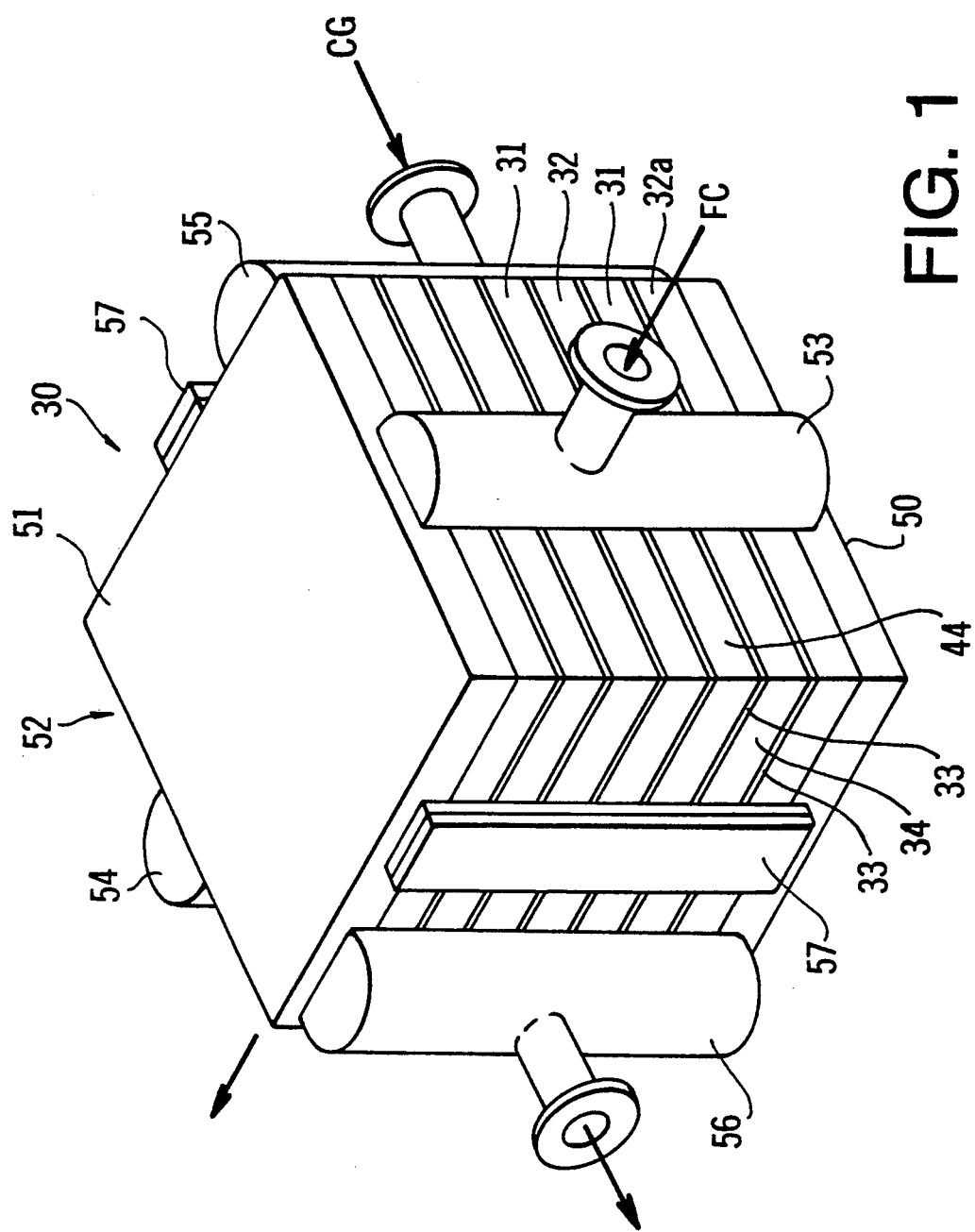
FIG. 1 shows a perspective view of a shift converter arrangement according to the present invention.

Referring to FIG. 1, illustrated is a plate type shift converter arrangement 30 according to the present invention. The shift converter arrangement 30 includes a stack of shift reactor plates 31 and cooling plates 32. The cooling plates 32 are provided to remove heat generated in the shift reactor plate 31.

The shift reactor plate 31 will be described with FIG. 2. A plate member (partition plate) 33 is accompanied with a masking frame (first masking frame) 34. An entrance 35 for a reformed gas FG and an exit 36 for the same are formed at the opposite positions in the first masking frame 34. Partition elements 37 and 38 are provided in the first masking frame 34 such that these elements extend parallel to each other and orthogonal to a direction of the reformed gas flow. Each partition element 37 (38) has a loophole upper portion to allow the reformed gas to flow through. An entrance chamber 39 is defined by the entrance partition element 37 and the first masking frame 34 and an exit chamber 40 is defined by the exit partition element 38 and the first masking frame 34. Between the partition elements 37 and 38, defined is a room 42 for a shift catalyst 41. The masking frame 34 which forms the catalyst room 42 has ports 43 for insertion and removal of the catalyst 41.

The cooling plate 32 includes a plate member 33 and another masking frame (second masking frame) 44. The plate member serves as a partition plate. The second masking frame 44 has an entrance 45 for a cooling agent and an exit 46 for the same at opposite corners. A fin plate 47 is provided in the second masking frame 44. The fin plate 47 has a wave like shape in section. The cooling agent flows from the entrance 45 to the exit 46 in a reversed "Z" passage formed by the fin plate 47. The fin plate 47 includes an intermediate fin portion 47a, an entrance fin portion 47b and an exit fin portion 47c. In the intermediate fin portion 47a, the cooling agent CG flows in the same direction as the gas in the catalyst chamber 42 of the shift reactor plate 31. The intermediate fin portion 47a is shaped like a parallelogram. The entrance fin portion 47b connects the entrance 45 to the intermediate fin portion 47a to uniformly distribute the cooling agent CG into the intermediate fin portion 47a. The exit fin portion 47c connects the intermediate fin portion 47a to the exit 46 to collectively discharge the cooling agent CG.

The shift reactor plates 31 and the cooling plates 32 are piled up alternately to form a stack 52 (FIG. 1).

Referring back to FIG. 1, a cooling plate 32a which is comprised of the masking frame 44 and the fin plate 47 but does not include a plate member 33 is placed on a bottom plate 50. On the cooling plate 32a, placed is the shift reactor plate 31 which includes a plate member 33. Then, the cooling plate 32 which now includes the plate member 33 is placed on the shift reactor plate 31. The cooling plates 32 and the shift reactor plates 31 are then piled up one after another. If the number of the shift reactor plates 31 is "n", the number of the cooling plates 32 will be "n+1". A top plate 51 is placed on the uppermost cooling plate 32. The stack 52 is formed by the bottom plate 50, the cooling plates 32a and 32 and the shift reactor plates 31 and the top plate 51. The plates 31, 32a, 32, 50 and 51 are joined with each other by means of seam welding or soldering (or brazing) so that the stack becomes a single unit.

Each shift reactor plate 31 has an entrance 35 which opens in one lateral portion (first lateral portion) of the stack 52. The entrances 35 are aligned in the height direction of the stack 52 and covered with a reformed gas intake manifold 53 of half cylinder shape. Each shift reactor plate 31 has an exit 36 which opens in a lateral portion opposite the first lateral portion. The exits 36 are aligned in the height direction of the stack 52 and covered with a reformed gas exhaust manifold 54. Likewise, the entrances 45 of the cooling plates 32 are aligned in the stack height direction and covered with a cooling agent intake manifold 55 and the exits 46 of the cooling plates 32 are aligned in the stack height direction and covered with a cooling agent exhaust manifold 56. The catalyst load and unload ports 43 and 44 are covered with plates 57, respectively. The plates 57 are removable.

When the reformed gas which contains about 1–19% of CO is fed to the intake manifold 53 of the plate type shift converter 30, the reformed gas flows into the entrance chamber 39 from the entrance 35 of each shift reactor plate 31 and then into the catalyst chamber 41 via the entrance partition element 37. In the catalyst chamber 41, the CO gas is shifted because of the shift catalyst 42 and $H_2O$ and the CO concentration is lowered to 1% or less. Then, the gas flows through the exit partition element 38, the exit chamber 40 and the exhaust manifold 54 and is discharged from the exit 36. Heat generated in the shift catalyst chamber 42 of the shift reactor plate 31 is transferred to the cooling fins 47 of the upper and lower cooling plates 32 via the upper and lower plate members 33. Then, the heat is cooled by the cooling agent CG which flows on (or over) each cooling fin 47 such that the gas temperature at the exit of the shift catalyst chamber 42 becomes 200° C. or less.

Figure 2:
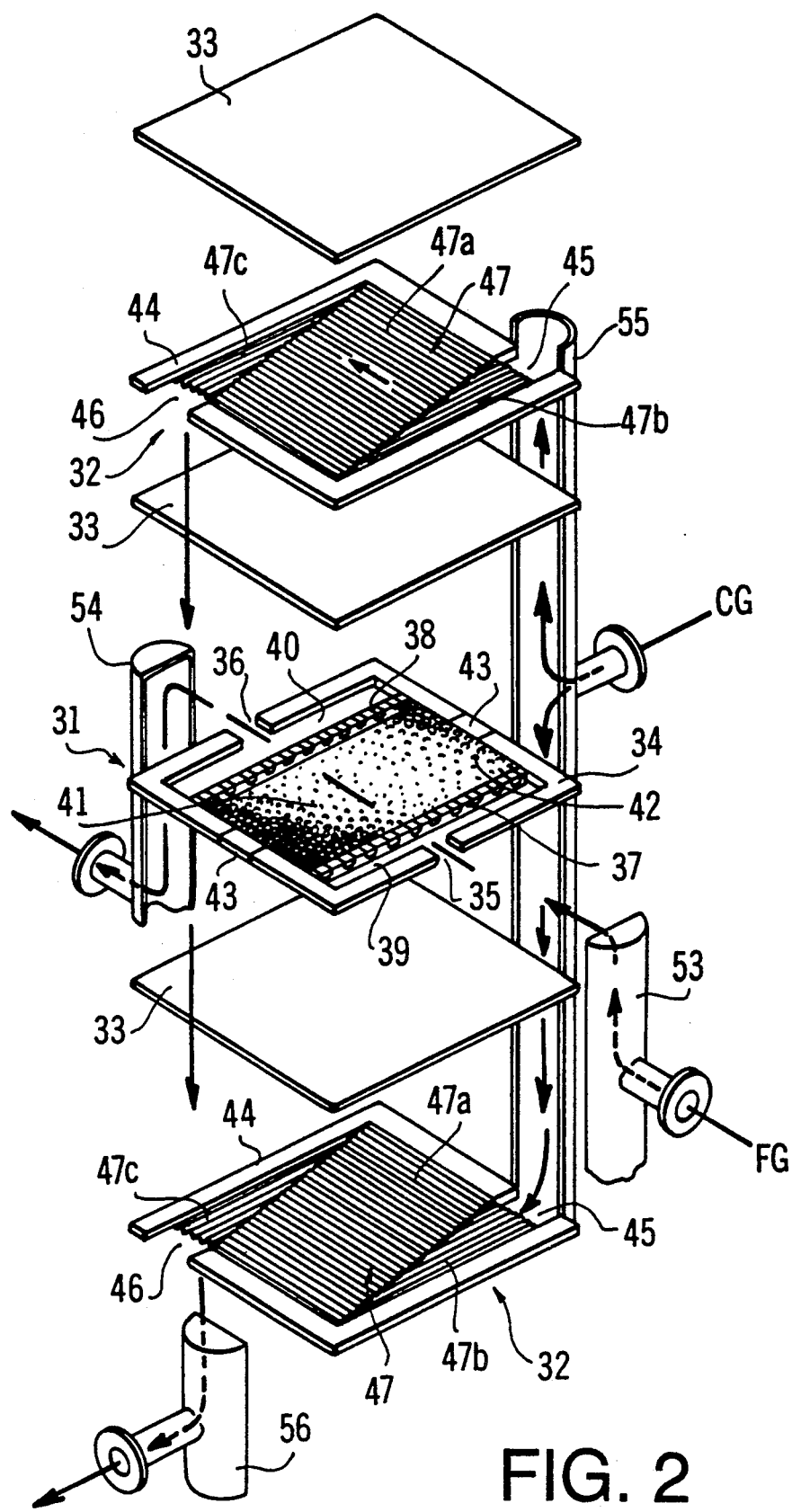
FIG. 2 shows an exploded view of major parts of the shift converter arrangement of FIG. 1.
Figure 3:
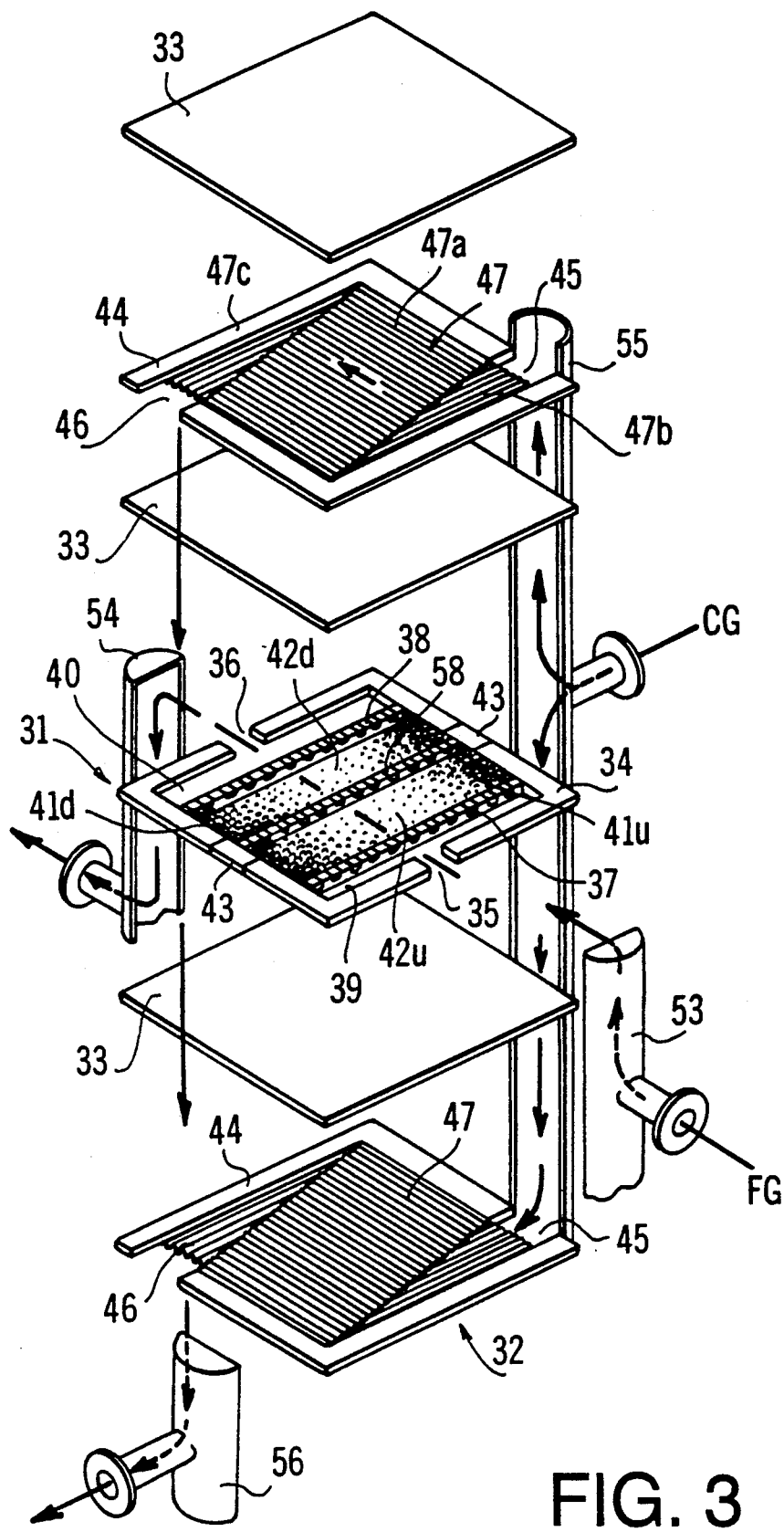
FIG. 3 shows a modified version of FIG. 2.

FIG. 3 shows a modification of FIG. 2. Specifically, a modified shift reactor plate 31 is depicted.

In this illustration, an intermediate partition element 58 is provided in the shift catalyst chamber 42 so that the catalyst chamber 42 is divided into an upstream chamber 42u and a downstream chamber 42d. A high temperature shift catalyst 41u is placed in the upstream chamber 42u and a low temperature shift catalyst 41d is placed in the downstream chamber 42d.

Figure 11:
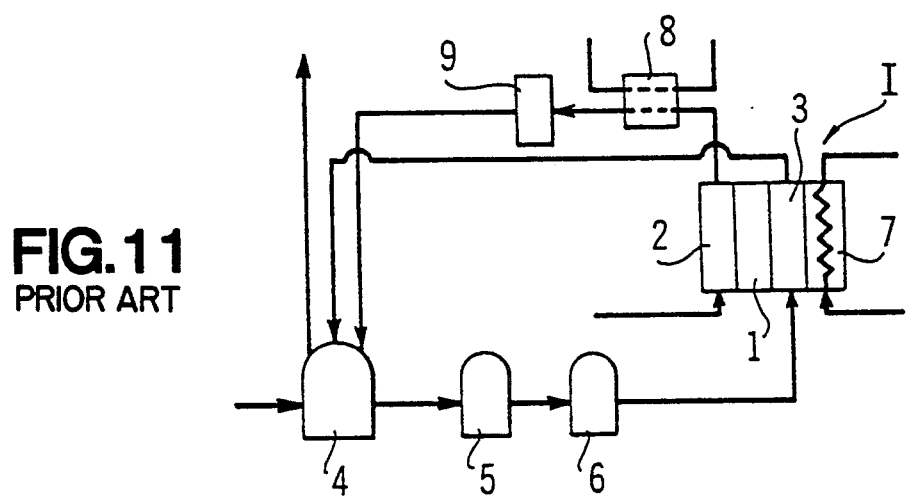
FIG. 11 is a schematic block diagram of a conventional power generation system using a phosphoric acid fuel cell stack.
Figure 12:
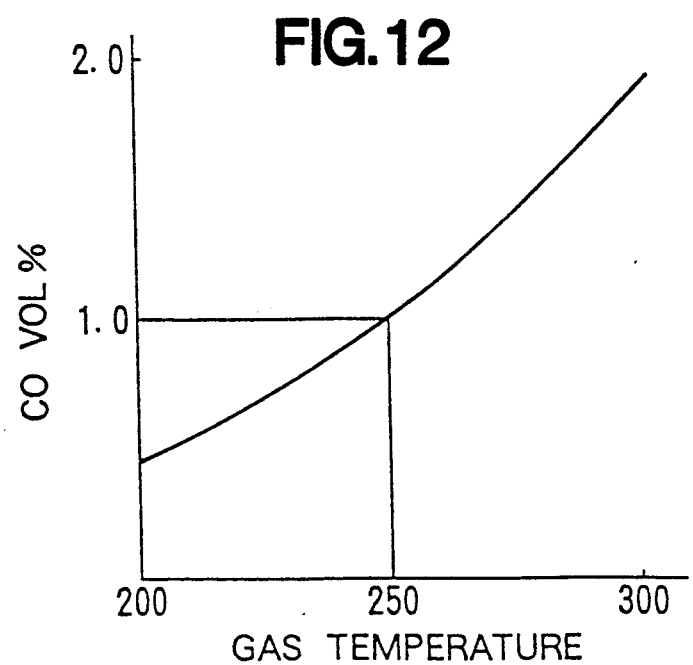
FIG. 12 shows the relation between the reformed gas temperature at the shift converter exit and the equilibrium CO concentration when S/C is set to 3 and methane is used as the raw material gas to be reformed.
Figure 13:
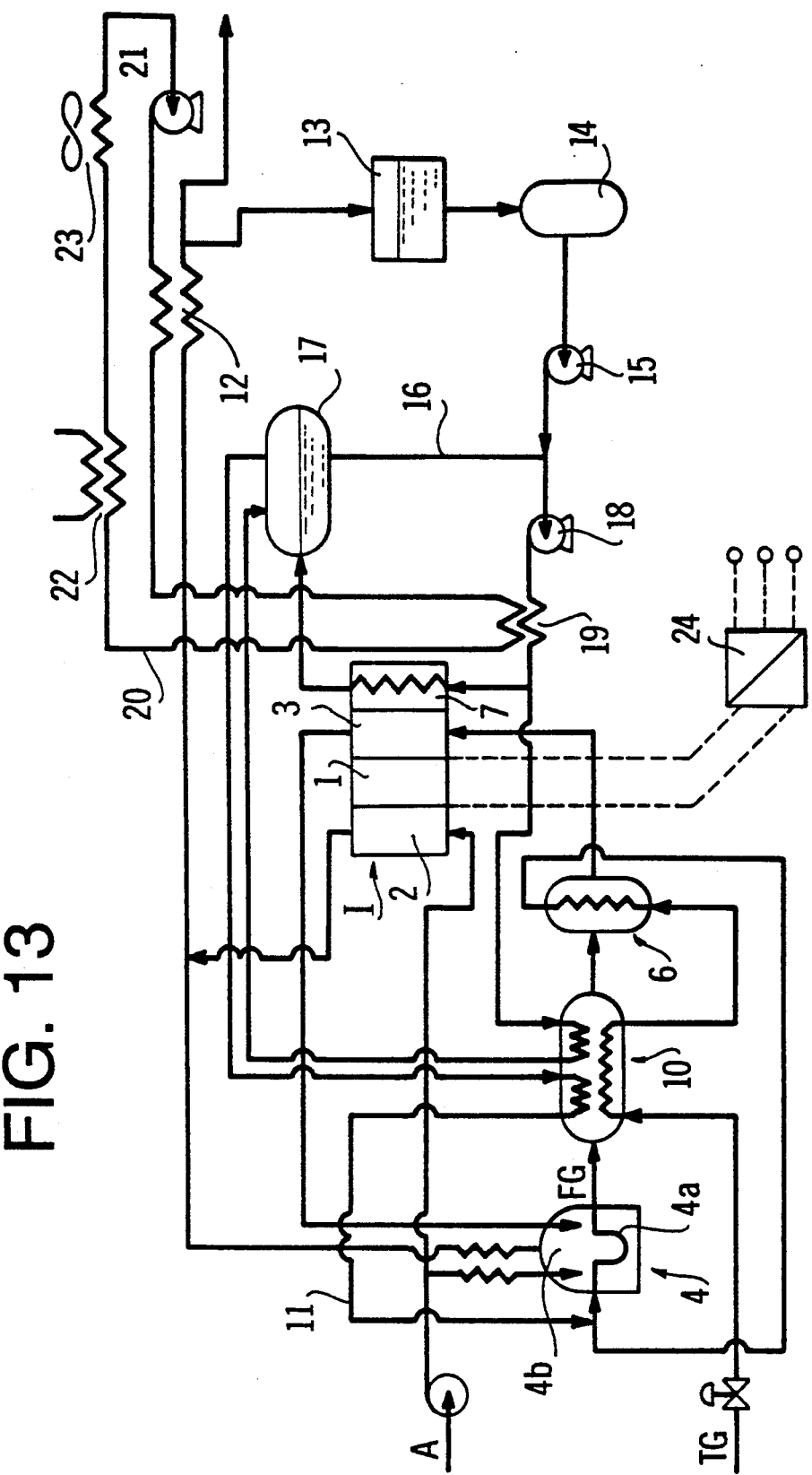
FIG. 13 shows a block diagram of a conventional power generation system using a phosphoric acid fuel cell stack.

Since the reactor plate 31 houses the high temperature shift catalyst 41u and the low temperature shift catalyst 41d, it is possible to directly feed the high temperature fuel gas to the shift reactor plate 31, as explained with FIG. 11, and to lower the CO concentration.

Figure 4:
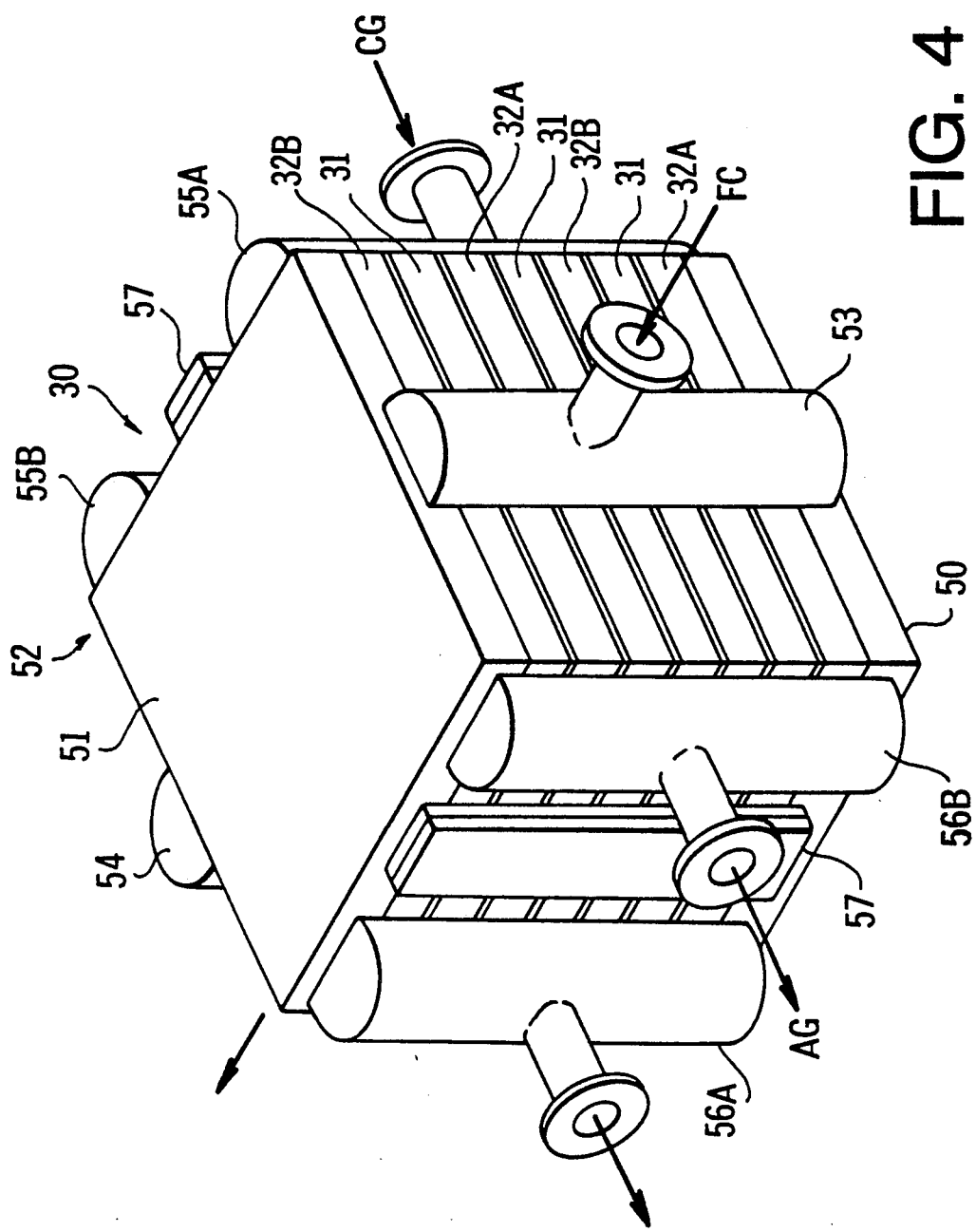
FIG. 4 shows a perspective view of another shift converter arrangement according to the present invention.
Figure 5:
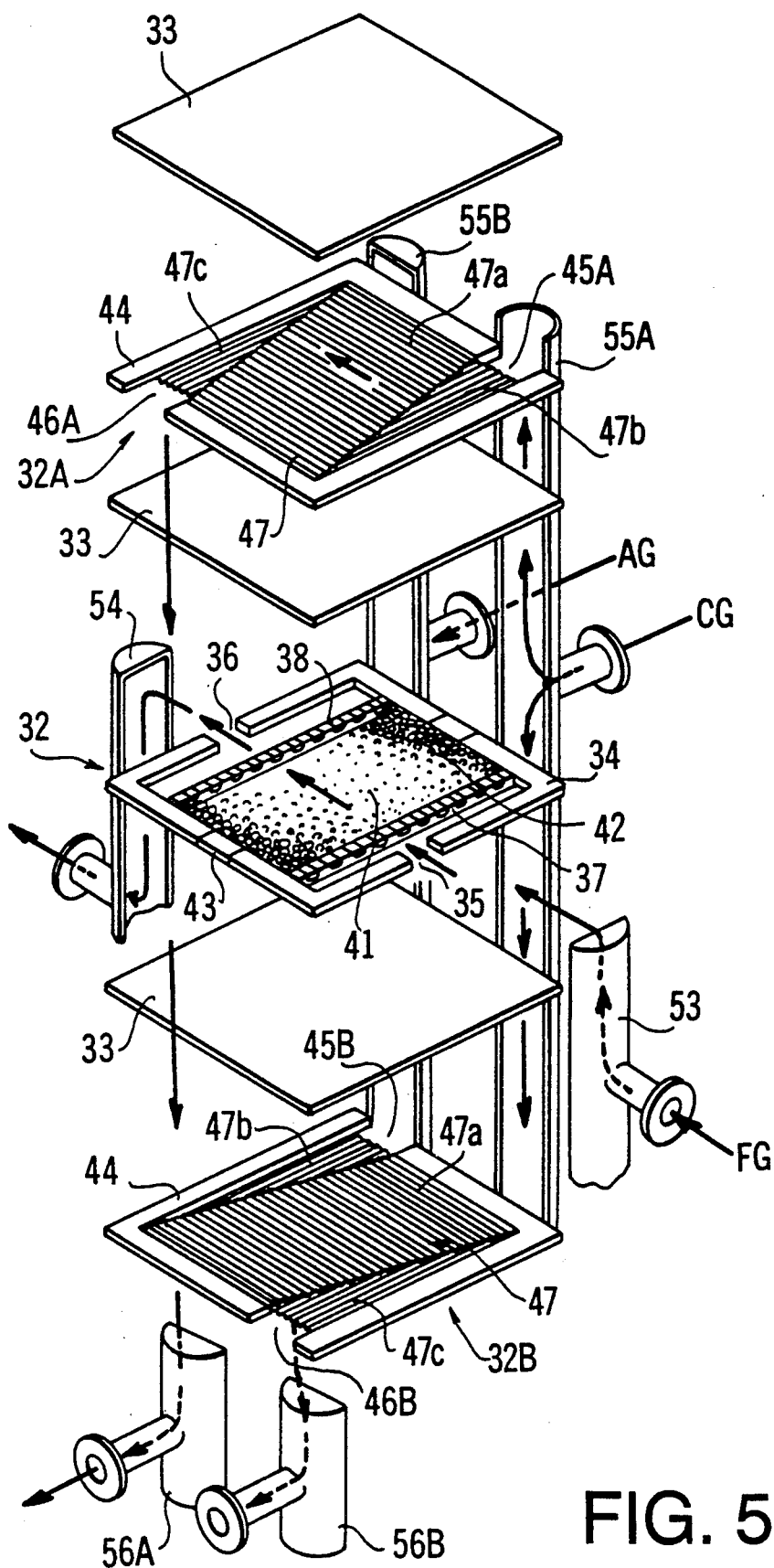
FIG. 5 shows an exploded view of major parts of the shift converter arrangement of FIG. 4.

FIGS. 4 and 5 show another embodiment of the present invention.

In this embodiment, different cooling agents are fed into the cooling plates 32 which sandwich the shift reactor plate 31.

The cooling agent CG (for example, air) which is the same cooling agent used in the embodiment of FIGS. 1-3 is introduced to a first cooling plate 32A of the shift reactor plate 31 whereas gases AG discharged from the anode of the phosphoric acid fuel cell element (called "anode exhaust gas") are introduced to a second cooling plate 32B.

In this case, the second cooling plate 32B has the substantially same shape as the first cooling plate 32A. However, the masking frame 44 and the fin plate 47 of the second cooling plate 32B are reversed relative to those of the first cooling plate 32A. Thus, the second entrances 45B and the first entrances 45A are aligned in zigzags in one lateral face of the stack 52 in the stack height direction and the second exits 46B and the first exits 46A are aligned in zigzags in the opposite lateral face of the stack 52 in the stack height direction. A cooling agent CG intake manifold 55A is provided for the first entrances 45A, a cooling agent CG exhaust manifold 56A is provided for the first exits 46A, an anode exhaust gas AG intake manifold 55B is provided for the second entrances 45B and an anode exhaust gas AG exhaust manifold 56B is provided for the second exits 46B.

The foregoing deals with the plate type shift converter arrangement 30. Now, a phosphoric acid fuel cell power generation system using the plate type shift converter arrangement 30 will be explained with FIGS. 6 and 8.

Figure 6:
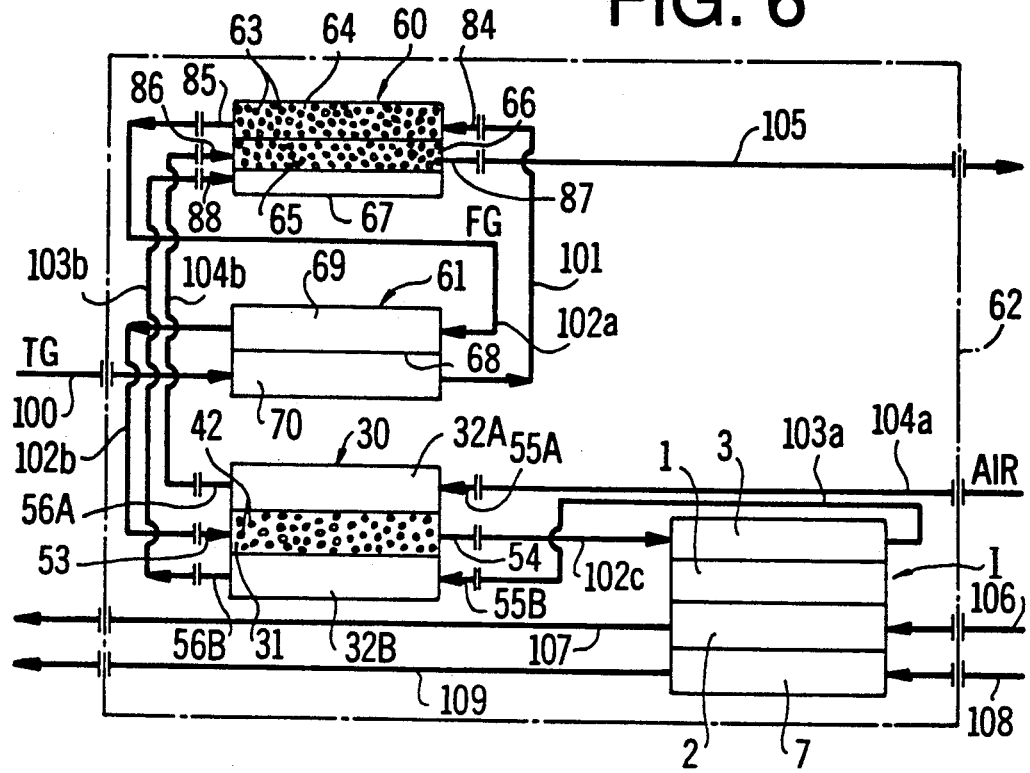
FIG. 6 illustrates a phosphoric acid fuel cell stack according to the present invention.

In FIG. 6, the reformer 60 is shaped like a plate and the heat exchanger 61 is also shaped like a plate. The reformer 60, the heat exchanger 61 and the plate type shift converter arrangement 30 of FIG. 4 are in the same pile. On the other hand, the phosphoric acid fuel cell stack I is located separately. The reformer 60, the heat exchanger 61, the shift converter arrangement 30 and the fuel cell stack I are housed in a single housing 62.

The plate type reformer 60 is comprised of a stack of reforming reactor plates 64, combustor plates 66 and fuel feed plates 67. A reforming catalyst 63 is placed in the reforming reactor plate 64. A combustion catalyst 65 is placed in the combustor plate 66. Fuel is fed to the combustor plate 66 from the fuel feed plate 67. The plate type heat exchanger 61 is comprised of a stack of high temperature fin plates 69 and low temperature fin plates 70. A separator plate 68 is interposed between each two adjacent high a low temperature fin plates.

The plate type shift converter 30 of FIG. 6 is the same as that of FIG. 4 (or 5) and is comprised of a stack of a second cooling plate 32B, a shift reactor plate 31 and a first cooling plate 32A. An anode exhaust gas from the fuel electrode 3 of each fuel cell element of the fuel cell stack I is introduced to the second cooling plate 32B. Air (cooling agent) is introduced to the first cooling plate 32A.

The fuel cell element includes an electrolyte plate 1, an air electrode 2 and a fuel electrode 3. The electrolyte plate 1 is sandwiched by these electrodes. The fuel cell elements are piled up via separators to form a fuel cell stack. A cooling element 7 is provided for each fuel cell element.

Figure 7:
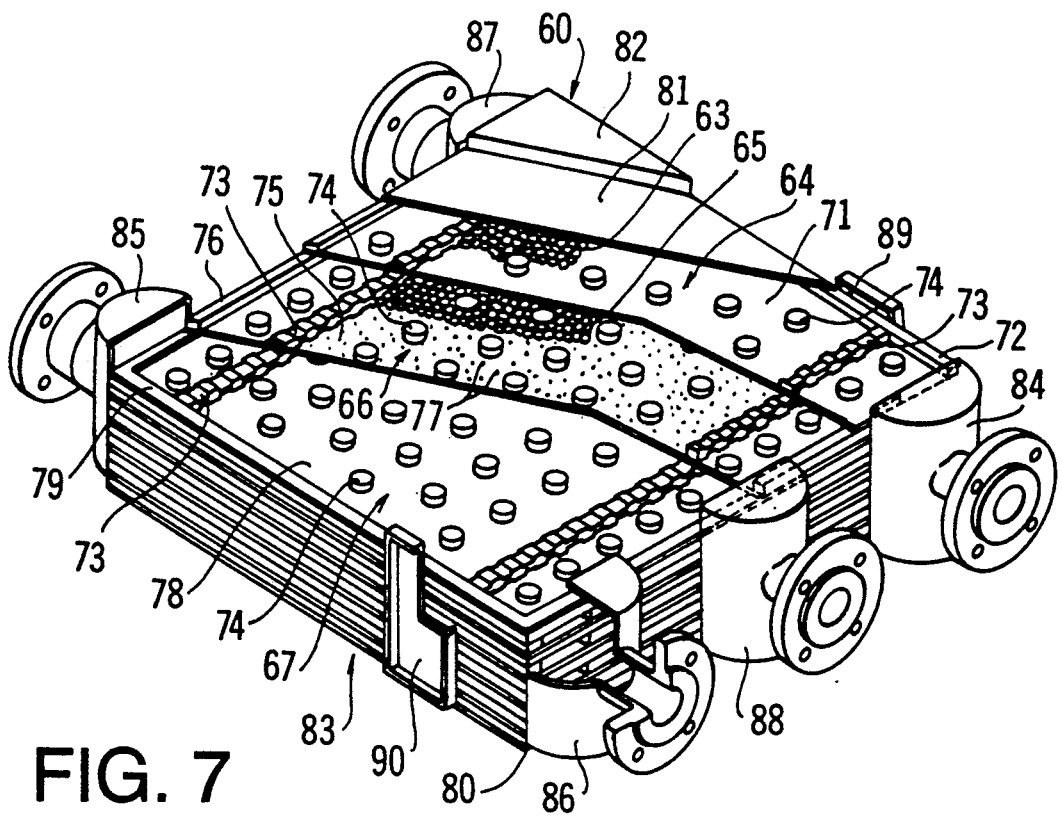
FIG. 7 illustrates a partially cutaway perspective view of the plate type reformer of FIG. 6.

The plate type reformer 60 will explained with FIG. 7. This reformer is similar to that disclosed in the U.S. patent application No. 617,996 filed Nov. 26, 1990, now U.S. Pat. No. 5,180,561 issued Jan. 19, 1993.

The plate type reformer 60 includes a fuel introduction plate 67, a combustor plate 66 and a reforming reactor plate 64, which are stacked in turn, as described earlier.

The reforming reactor plate 64 includes a first plate member 71, a first masking frame 72, partition elements 73, spacer members 74 and a reforming catalyst 63. Specifically, in the reforming reactor plate 64, the first masking frame 72 is located in the first member 71. The first masking frame 72 is partially cut out to form a reformed gas entrance and a reformed gas exit. The partition elements 73 are mounted on the first plate member 71. The partition elements 73 are parallel to each other and extend near the opposite sides of the first plate member 71, respectively. Upper and lower faces of each partition element 73 are shaped like a loophole. The small cylindrical members 74 which serve as the spacer members are also provided on the first plate member 71. The cylindrical members 74 have the same height as the masking frame 72. A space between the partition elements 73 is filled with the reforming catalyst 63.

The combustor plate 66 includes a second plate member 75, a second masking frame 76, spacer members 74 and a combustion catalyst 65. Specifically, the second masking frame 76 is mounted on the second plate member 75. The second masking frame 76 is partially cut out to form an air entrance and an exhaust gas exit. The partition elements 73 are also mounted on the second plate member 75 near the opposite sides of the second plate member 75. The partition elements 73 extend parallel to each other. The spacer members 74 projects from the second plate member 75. The second plate member 75 has a number of dispersion holes 77 between the partition elements 73 and the combustion catalyst 65 is placed on the second plate member 75 between the partition elements 73.

The fuel introduction plate 67 includes a third plate member 78, a third masking frame 79, partition elements 73 and spacer members 74. The third masking frame 79 is partially cut out to form a fuel introduction entrance only. The third masking frame 79, the partition elements 73 and the spacer members 74 are mounted on the third plate 78, like the reforming reactor plate 64 or the combustor plate 66.

These plates 64, 66 and 67 are stacked as follows: First, the fuel introduction plate 67 is mounted on the bottom plate 80. Then, the combustor plate 66, the reforming reactor plate 64 and the fuel introduction plate 67 are piled up in turn. After that, the combustor plate 66 and the reforming reactor plate 64 piled up. A partition plate 81 is mounted on the uppermost reforming reactor plate 64 and a top plate 82 is mounted on the partition plate 81. These plates 64, 66, 67, 80, 81 and 82 are joined with each other to form an integrated body or a single stack body 83 by means of welding or soldering (or brazing).

Each reforming reactor plate 64 has a raw material intake opening which opens in a single lateral face (first lateral face) of the stack body 83. The raw material intake openings are aligned in the height direction of the first lateral face and a raw material gas intake manifold 84 covers the raw material gas intake openings. On the opposite lateral face (second lateral face), attached is a raw material gas exhaust manifold 85 which covers the vertically aligned raw material gas exhaust openings of the reforming reactor plates 64. Likewise, an air intake manifold 86 is attached to the first lateral face of the stack body 83 to cover the vertically aligned air intake openings of the combustor plates 66 and a combustion exhaust gas manifold 87 is attached to the second lateral face of the stack body 83 to cover the vertically aligned combustion exhaust openings. In addition, a fuel introduction manifold 88 is attached to the first lateral face of the stack body 83.

The stack body 83 has a reforming catalyst exchange port 89 in another lateral face of the stack body 83 to load and unload the reforming catalyst 63 into and from the reforming reactor plate 64. Likewise, the stack body 83 has a combustion catalyst exchange port 90 in the opposite lateral face of the stack body 83 to load and unload the combustion catalyst 65 into and from the combustor plate 66.

Figure 8:
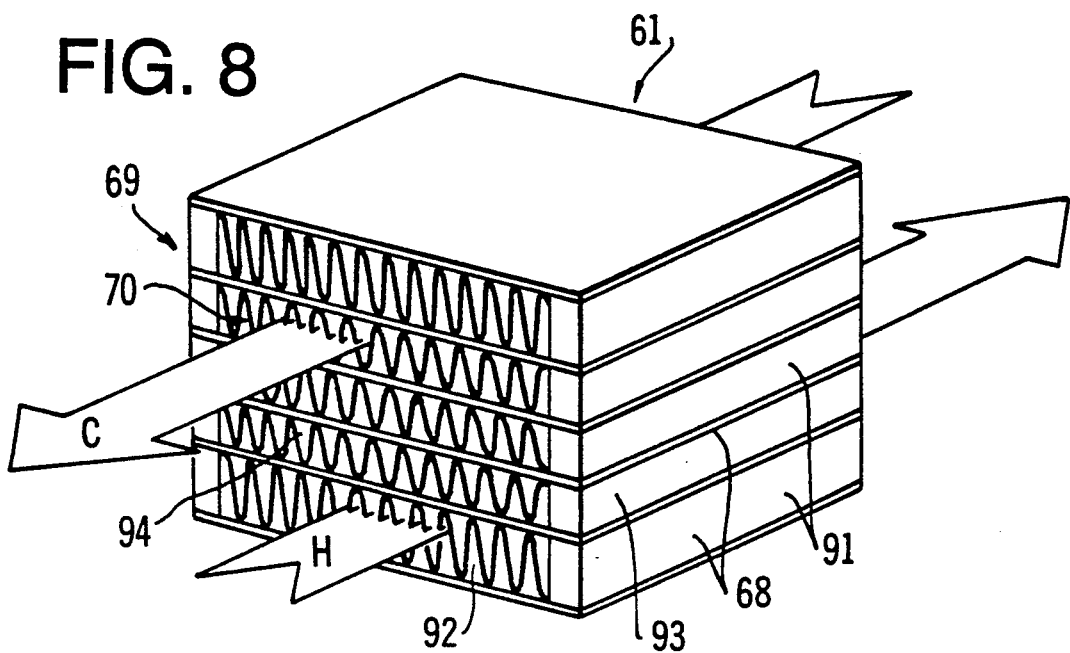
FIG. 8 illustrates a perspective view of the plate fin type heat exchanger of FIG. 6.

Referring to FIG. 8, the plate type heat exchanger 61 includes a high temperature fin plate 69, a partition plate 68 and a low temperature fin plate 70. The high temperature fin plate 69 is located on the partition plate 68 and the low temperature fin plate 70 is also located on another partition plate 68. The high temperature fin plate 69 includes a high temperature masking frame 91 and a fin portion 92 through which a high temperature fluid H flows. The low temperature fin plate 70 includes a low temperature masking frame 93 and a fin portion 94 through which a low temperature fluid C flows. The high and low temperature fin plates 69 and 70, which respectively accompany the partition plates, are stacked. The high and low temperature fluids are fed/discharged to/from intake/exhaust manifolds (not shown) connected to the plate type heat exchanger 61.

Referring back to FIG. 6, the raw material gas TG which contains methane gas and steam is fed to the low temperature fin plate 70 of the plate type heat exchanger 61 from a feed line 100. The exit of the plate type heat exchanger 61 is connected to the raw material gas intake manifold 84 by a raw material gas line 101. The raw material gas TG fed to the reforming reactor plates 64 of the plate type reformer 60 from the raw material gas intake manifold 84 is reformed to the fuel gas FG with the reforming catalyst 63 and the fuel gas is discharged to the high temperature fin plate 69 of the plate type heat exchanger 61 from the reformed gas (fuel gas) exhaust manifold 85 via a first fuel gas line 102a. Then, the fuel gas is introduced to the shift reactor plate 31 through a second fuel gas line 102b and the reformed gas (fuel gas) intake manifold 53 of the shift converter 30. The fuel gas fed to the shift reactor plate 31 is shifted such that its CO concentration becomes 1% or less. Then, the fuel gas flows through the reformed gas exhaust manifold 54, a third fuel gas line 102c and reaches the fuel electrode 3 of each phosphoric acid fuel cell of the fuel cell stack I.

The anode exhaust gas from the fuel electrode 3 is fed to the second cooling plate 32B from the exhaust gas intake manifold 55B by a first exhaust gas line 103a. Then, the anode exhaust gas flows to the fuel introduction plate 67 through the exhaust gas manifold 56B and a second exhaust gas line 103B. The gas proceeds to the combustor plate 66 from the introduction plate 66.

On the other hand, the air is introduced to the first cooling plate 32A from a first air feed line 104a and the air intake manifold 55A. Then, the air flows through the exhaust manifold 56B, a second air feed line 104b and the air intake manifold 86 and reaches the combustor plate 66. In the combustor plate 66, non-reacted, combustible gases contained in the anode exhaust gas fed from the fuel introduction plate 67 are combusted with the introduced air. Consequently, the reforming reactor plate 64 is heated and the reforming temperature is maintained. Combustion exhaust gas from the combustor plate 66 is expelled out of the housing 62 from the combustion exhaust gas manifold 87 and an exhaust gas line 105.

As shown in FIG. 6, an air feed line 106 and a discharge line 107 are connected to the air electrode 2 and a cooling agent feed line 108 and a discharge line 109 are connected to the cooling portion 7.

In FIG. 6, the plate type reformer 60, the plate type heat exchanger 61 and the plate type shift converter 30 are in the same pile. However, since operation temperatures of these units are different from each other, heat insulators may be interposed between the units.

Figure 9:
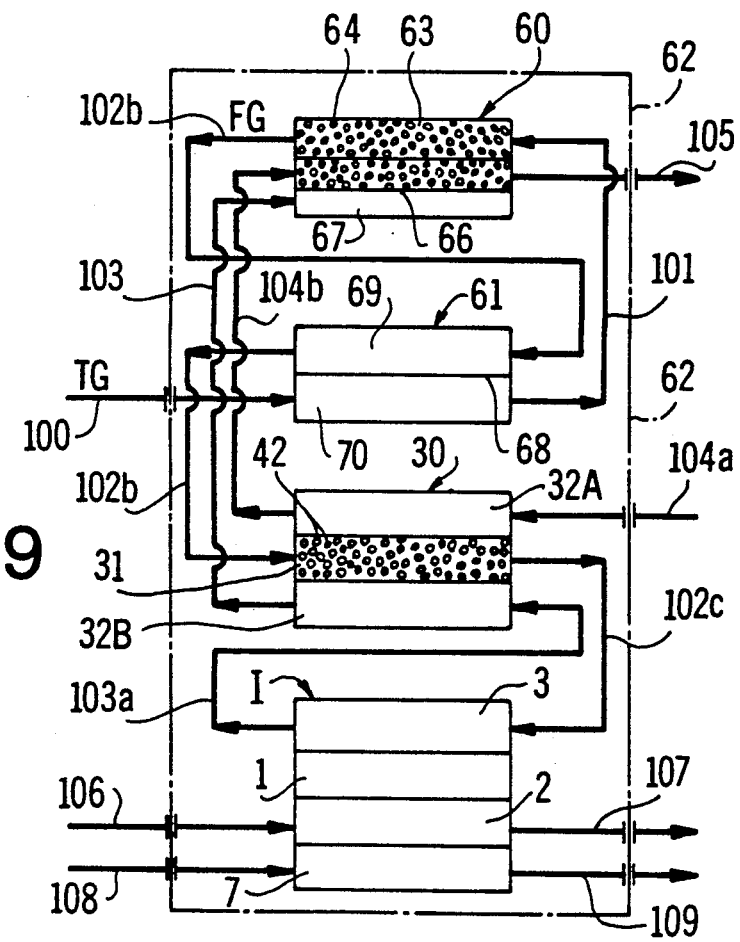
FIG. 9 illustrates a schematic block diagram of a power generation system using a phosphoric acid fuel cell stack.
Figure 10:
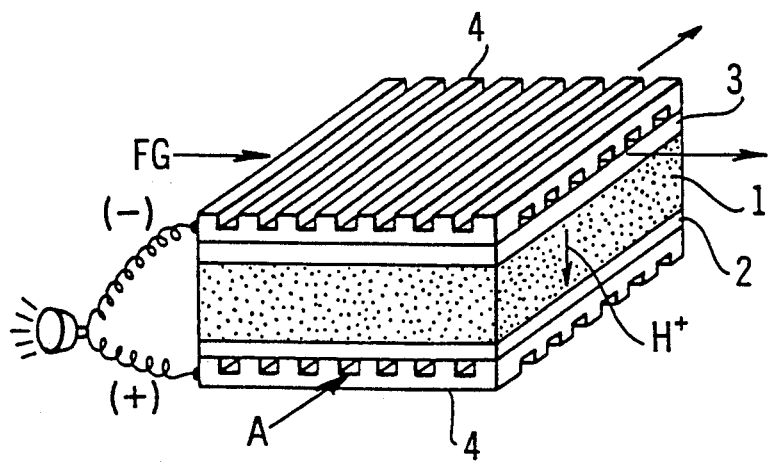
FIG. 10 illustrates a conventional phosphoric fuel cell.

FIG. 9 shows another power generation system using the phosphoric acid fuel cell stack.

In this power generation system, the plate type reformer 60, the plate type heat exchanger 61, the plate type shift converter 30 and the phosphoric acid fuel cell stack I are stacked in the same pile in the housing 62. Other structure is fundamentally the same as the system of FIG. 6.

In FIG. 9, the lines 101, 102a–102c, 103a, 103b, 104a and 104b may accompany manifolds, respectively. Alternatively, various gas passages may be formed in the units themselves and the gas passages may substitute for the lines 101, 102a–102c, 103a, 103b, 104a and 104b as the units are stacked.

We claim:

1. A plate shift converter comprising: a stack of shift reactor plates and cooling plates, each shift reactor plate being sandwiched between two cooling plates for cooling the shift reactor plate and including a first plate member, a first masking frame extending along a periphery of the first plate member, a first gas entrance formed in the first masking frame, a first gas exit formed at a position opposite the first gas entrance in the first masking frame and a shift catalyst located in the first masking frame, and the cooling plate including a second plate member, a second masking frame extending along a periphery of the second plate member, a second gas entrance formed in the second masking frame and a second gas exit formed at a position opposite the second gas entrance in the second masking frame;

a first gas intake manifold mounted on a lateral face of the stack for covering the first gas entrance of the shift reactor plate;

first gas exhaust manifold mounted on a lateral face of the stack for covering the first gas exit of the shift reactor plate;

a second gas intake manifold mounted on a lateral face of the stack for covering the second gas entrance of the cooling plate; and a second gas exhaust manifold mounted on a lateral face of the stack for covering the second gas exit of the shift reactor plate.

2. The plate shift converter of claim 1, further including an entrance side partition element and an exit side partition element on the first plate member and wherein the partition elements extend parallel to each other, each partition element has a loophole structure and the shift catalyst is placed between the partition elements on the first plate member.

3. The plate shift converter of claim 2, wherein an entrance chamber is defined between the first gas entrance of the first masking frame and the entrance side partition element and an exit chamber is defined between the first gas exit of the first masking frame and the exit side partition element.

4. The plate shift converter of claim 3, wherein the second masking frame includes a fin plate, wherein the second gas entrance of the second masking frame positions at a lateral portion of the entrance chamber of the shift reactor plate in the stack, the second gas exit of the second masking frame positions at a lateral portion of the exit chamber of the shift reactor plate in the stack, and wherein the fin plate includes an entrance plate portion defining a passage which extends along the entrance chamber, an exit plate portion defining a passage which extends along the exit chamber and an intermediate fin portion connecting the entrance plate portion with the exit plate portion and defining a passage extending in the same direction as a gas flow in the shift reactor plate in the stack.

5. The plate shift converter of claim 4, wherein the manifolds are attached to the lateral face of the stack by means of welding.

6. The plate shift converter of claim 5, further including a top plate mounted on an uppermost plate of the stack and a bottom plate mounted on an lowermost plate of the stack.

7. The plate shift converter of claim 2, wherein a port is formed in the first masking frame between the partition elements for loading and unloading the shift catalyst.

8. The plate shift converter of claim 1, wherein the shift reactor plates and the cooling plates are stacked alternately and the stacked plates are welded, soldered or brazed to each other to form an integrated body.

9. A plate shift converted comprising: a stack of shift reactor plates and cooling plates, each shift reactor plate being sandwiched between two cooling plates for cooling the shift reactor plate and including a first plate member, a first masking frame extending along a periphery of the first plate member, a first gas entrance formed in the first masking frame, a first gas exit formed at a position opposite the first gas entrance in the first masking frame, an upstream side shift catalyst located in an upstream area of the first masking frame and a downstream side shift catalyst located in a downstream area of the first masking frame, and the cooling plate including a second plate member, a second masking frame extending along a periphery of the second plate member, a second gas entrance formed in the second masking frame and a second gas exit formed at a position opposite the second gas entrance in the second masking frame;
- a first gas intake manifold mounted on a lateral face of the stack for covering the first gas entrance of the shift reactor plate;
- a first gas exhaust manifold mounted on a lateral face of the stack for covering the first gas exit of the shift reactor plate;
- a second gas intake manifold mounted on a lateral face of the stack for covering the second gas entrance of the cooling plate; and
- a second gas exhaust manifold mounted on a lateral face of the stack for covering the second gas exit of the cooling plate.

10. The plate shift converter of claim 9, further including an entrance side partition element, an exit side partition element and an intermediate partition element on the first plate member and wherein the partition elements extend parallel to each other, each partition element has a loophole structure, the upstream side shift catalyst is placed between the entrance side partition element and the intermediate partition element on the first plate member and the downstream side shift catalyst is placed between the intermediate partition element and the downstream side partition element on the first plate member.

11. The plate shift converter of claim 10, wherein an entrance chamber is defined between the first gas entrance of the first masking frame and the entrance side partition element and an exit chamber is defined between the first gas exit of the first masking frame and the exit side partition element.

12. The plate shift converter of claim 11, wherein a port is formed in the first masking frame at each end of the intermediate partition element for loading and unloading the upstream and downstream side shift catalysts.

13. The plate shift converter of claim 11, wherein the second masking frame includes a fin plate, wherein the second gas entrance of the second masking frame positions at a lateral portion of the entrance chamber of the shift reactor plate in the stack, the second gas exit of the second masking frame positions at a lateral portion of the exit chamber of the shift reactor plate in the stack, and wherein the fin plate includes an entrance plate portion defining a passage which extends along the entrance chamber, an exit plate portion defining a passage which extends along the exit chamber and an intermediate fin portion connecting the entrance plate portion with the exit plate portion and defining a passage extending in the same direction as a gas flow in the shift reactor plate in the stack.

14. The plate shift converter of claim 9, wherein the shift reactor plates and the cooling plates are stacked alternately and the stacked plates are seam welded to each other to form an integrated body.

15. The plate shift converter of claim 14, wherein the manifolds are attached to the lateral face of the stack by means of welding.

16. The plate shift converter of claim 15, further including a top plate mounted on an uppermost plate of the stack and a bottom plate mounted on an lowermost plate of the stack.

17. A plate shift converter comprising: a stack of shift reactor plates and cooling plates, each shift reactor plate being sandwiched between two cooling plates for cooling the shift reactor plate and including a first plate member, a first masking frame extending along a periphery of the first plate member, a first gas entrance formed in the first masking frame, a first gas exit formed at a position opposite the first gas entrance in the first masking frame and a shift catalyst located in first masking frame, the first cooling plate including a second plate member, a second masking frame extending along a periphery of the second plate member, a second gas entrance formed in the second masking frame, a second gas exit formed at a position opposite the second gas entrance in the second masking frame and a first fin plate located in the second masking frame, and the second cooling plate including a third plate member, a third masking frame extending along a periphery of the third plate member, a third gas entrance formed in the third masking frame, the third gas entrance being formed at a position different from the second gas entrance, a third gas exit formed at a position opposite the third gas entrance in the third masking frame, the third gas exit being formed at a position different from the second gas exit and a second fin plate located in the third masking frame;

a first gas intake manifold mounted on a lateral face of the stack for covering the first gas entrance of the shift reactor plate;

a first gas exhaust manifold mounted on a lateral face of the stack for covering the first gas exit of the shift reactor plate;

a second gas intake manifold mounted on a lateral face of the stack for covering the second gas entrance of the first cooling plate;

a second gas exhaust manifold mounted on a lateral face of the stack for covering the second gas exit of the first cooling plate;

a third gas intake manifold mounted on a lateral face of the stack for covering the third gas entrance of the second cooling plate; and a third gas exhaust manifold mounted on a lateral face of the stack for covering the third gas exit of the second cooling plate.

18. The plate shift converter of claim 17, further including an entrance side partition element and an exit side partition element on the first plate member and wherein the partition elements extend parallel to each other, each partition element has a loophole structure, the shift catalyst is placed between the entrance side partition elements on the first plate member.

19. The plate shift converter of claim 18, wherein an entrance chamber is defined between the first gas entrance of the first masking frame and the entrance side partition element and an exit chamber is defined between the first gas exit of the first masking frame and the exit side partition element.

20. The plate shift converter of claim 18, wherein a port is formed in the first masking frame between the partition elements for loading and unloading the shift catalysts.

21. The plate shift converter of claim 19, wherein
the second masking frame of the first cooling plate has the same configuration as the third masking frame of the second cooling plate, the, first fin plate of the first cooling plate has the same configuration as the second fin plate of the second cooling plate, and the masking frames and fin plates of the first and second cooling plates are arranged like mirror images in the stack as viewed from a shift reactor plate therebetween;
the second gas entrance and the third gas entrance position at lateral portions of the entrance chamber and the second gas exit and the third gas exit position at lateral portions of the exit chamber; and
each fin plate has an entrance plate portion, an exit plate portion and an intermediate fin plate portion, and the entrance plate portion defines a first passage extending along the entrance chamber, the exit plate portion defines a second passage extending along the exit chamber and the intermediate fin portion has a parallelogram shape, connects the entrance plate portion with the exit plate portion and defines a third passage extending parallel to a gas flow direction in the shift reactor plate, with the third passages of the first and second fin plates being directed in opposite directions.

22. The plate shift converter of claim 17, wherein the second cooling plate, the shift reactor plate and the first cooling plate are piled up in turn in the stack, and these plates are seam welded to each other to form an integrated body.

23. The plate shift converter of claim 22, wherein all the manifolds are mounted on the stack by means of welding.

24. A power generation system comprising: a plate reformer including a reforming reactor plate, a reforming catalyst, a combustor plate, a combustion catalyst and a fuel introduction plate, the reforming catalyst being placed in the reforming reactor plate, raw material gas being introduced to the reforming reactor plate, the combustion catalyst being placed in the combustor plate, air being introduced to the combustor plate, fuel gas being introduced to the fuel introduction plate, the fuel gas being delivered to the combustor plate from the fuel introduction plate, and the reforming reactor plate, the combustor plate and the fuel introduction plate being stacked;

a plate type heat exchanger including a high temperature fin plate, a low temperature fin plate and a partition plate, a high temperature fluid flowing through the high temperature fin plate, a low temperature fluid flowing through the low temperature fin plate, the high and low temperature fin plates being stacked with the partition plate being interposed;

a plate type shift converter including a stack of shift reactor plates and cooling plates, each shift reactor plate being sandwiched between two cooling plates for cooling the shift reactor plate, a shift catalyst being placed in each shift reactor plate, a cooling agent flowing through each cooling plate, and the shift reactor plates and the cooling plates being stacked;

a phosphoric acid fuel cell stack, each phosphoric acid fuel cell having an electrolyte plate, a fuel electrode and an air electrode, the electrolyte plate being sandwiched by the electrodes; and a housing for accommodating the plate type reformer, the plate type heat exchanger, the plate type shift converter and the fuel cell stack, the plate type reformer, the plate type heat exchanger and the plate type shift converter being in one pile, with the fuel gas from the reforming reactor plate of the reformer being fed to the fuel electrode of each phosphoric acid fuel cell through the high temperature fin plate of the heat exchanger and the shift reactor plate of the shift converter.

25. A power generation system comprising: a plate reformer including a reforming reactor plate, a reforming catalyst, a combustor plate, a combustion catalyst and a fuel introduction plate, the reforming catalyst being placed in the reforming reactor plate, raw material gas being introduced to the reforming reactor plate, the combustion catalyst being placed in the combustor plate, air being introduced to the combustor plate, fuel gas being introduced to the fuel introduction plate, the fuel gas being delivered to the combustor plate from the fuel introduction plate, and the reforming reactor plate, the combustor plate and the fuel introduction plate being stacked;

a plate type heat exchanger including a high temperature fin plate, a low temperature fin plate and a partition plate, a high temperature fluid flowing through the high temperature fin plate, a low temperature fluid flowing through the low temperature fin plate, the high and low temperature fin plates being stacked with the partition plate being interposed;

a plate type shift converter including a stack of shift reactor plates and cooling plates, each shift reactor plate being sandwiched between two cooling plates for cooling the shift reactor plate, a shift catalyst being placed in each shift reactor plate, a cooling agent flowing through each cooling plate, and the shift reactor plates and the cooling plates being stacked;

a phosphoric acid fuel cell stack, each phosphoric acid fuel cell having an electrolyte plate, a fuel electrode and an air electrode, the electrolyte plate being sandwiched by the electrodes; and a housing for accommodating the plate type reformer, the plate type heat exchanger, the plate type shift converter and the fuel cell stack, the plate type reformer, the plate type heat exchanger, the plate type shift converter and the fuel cell stack being in one pile, with the fuel gas from the reforming reactor plate of the reformer being fed to the fuel electrode of each phosphoric acid fuel cell through the high temperature fin plate of the heat exchanger and the shift reactor plate of the shift converter.

* * * * *